(12) United States Patent
Strand et al.

(10) Patent No.: US 6,279,310 B1
(45) Date of Patent: Aug. 28, 2001

(54) GAS TURBINE STARTING METHOD USING GAS AND LIQUID FUELS

(75) Inventors: Torsten Strand; Leif G. Andersson, both of Finspång (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/701,970
(22) PCT Filed: Jun. 4, 1999
(86) PCT No.: PCT/SE99/00966
　§ 371 Date: Dec. 6, 2000
　§ 102(e) Date: Dec. 6, 2000
(87) PCT Pub. No.: WO00/00773
　PCT Pub. Date: Jan. 6, 2000

(30) Foreign Application Priority Data

Jun. 18, 1998 (SE) .................................... 9802200

(51) Int. Cl.$^7$ .................................... F02C 7/264
(52) U.S. Cl. .................. 60/39.06; 60/39.141; 60/39.463
(58) Field of Search .................. 60/39.06, 39.141, 60/39.463, 39.826

(56) References Cited

U.S. PATENT DOCUMENTS

| | | |
|---|---|---|
| 3,866,413 | 2/1975 | Sturgess . |
| 4,455,840 | 6/1984 | Matt et al. . |
| 4,548,032 | 10/1985 | Sepulveda et al. . |
| 4,600,151 | 7/1986 | Bradley . |
| 4,833,878 * | 5/1989 | Sood et al. .................. 60/39.141 |
| 4,897,994 | 2/1990 | Shekleton . |
| 4,944,153 * | 7/1990 | Goerlich et al. .................. 60/39.826 |
| 4,967,561 | 11/1990 | Brühwiler et al. . |
| 5,244,380 | 9/1993 | Döbbeling . |
| 5,359,847 | 11/1994 | Pillsbury et al. . |
| 6,128,894 * | 10/2000 | Joos et al. .................. 60/39.43 |

* cited by examiner

Primary Examiner—Louis J. Casaregola
(74) Attorney, Agent, or Firm—Burns, Doane, Swecker & Mathis, L.L.P.

(57) ABSTRACT

A method for starting a burner device for a gas turbine, where the burner device comprises at least one burner member (5), arranged to be supplied with a liquid fuel, and an ignition member (9), which is activated for igniting a fuel which is supplied to the burner member (5). The fuel which initially is supplied to the burner member (5) and which is ignited by means of the ignition member and generates a burner member flame mainly comprises an ignition gas.

4 Claims, 1 Drawing Sheet

GAS TURBINE STARTING METHOD USING GAS AND LIQUID FUELS

BACKGROUND OF THE INVENTION AND PRIOR ART

Figure 1:
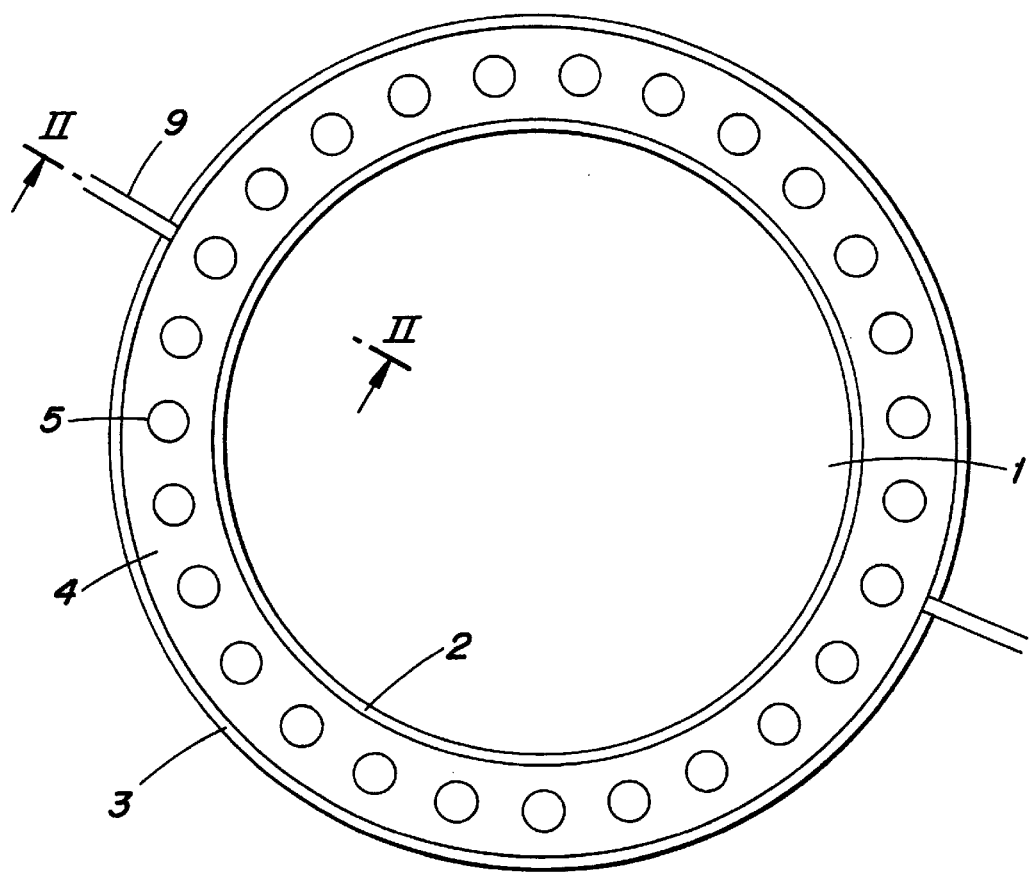

The present invention concerns a method for starting a burner device for a gas turbine, wherein the burner device comprises at least one burner member, arranged to be supplied with a liquid fuel, and an ignition member, which is activated for igniting a fuel which is supplied to the burner member.

Such starting methods are already well known. In the prior technology, the ignition member, which preferably is formed by a separate ignition burner, is often activated by means of an ignition plug or the like, such that an ignition flame is obtained. The ignition burner uses for example liquefied petroleum gas or natural gas as fuel.

Since the invention is particularly suitable in connection with burner devices which use a liquid fuel, preferably an oil, it will below in an exemplifying but not limiting purpose be described with reference to such a burner device.

In a burner device of this kind, the main portion of the air which is supplied to a combustion chamber connected to the burner device is supplied via the flame zone which is defined by the burner member or members included in the burner device.

During the start of the burner device it is important that the concentration of fuel in an ignition zone of the burner member is such that the activation of the ignition member immediately results in a corresponding ignition of the fuel and in the generation of a burner member flame. If the fuel concentration is such that no immediate ignition and generation of a burner member flame is obtained, the mixture of fuel and incoming air will flow through the combustion chamber and into a subsequent turbine. If the ignition of the fuel takes place at such a late stage, the generated flame will extend all the way through the combustion chamber and into the turbine as far as the mixture of fuel and air which may be ignited extends. Said mixture may extend all the way to and into an exhaust channel connected to the turbine. When the exhaust channel in this manner is filled with an explosive mixture which may ignited, this may lead to the fact that an explosion takes place in the exhaust channel. Such an explosion may have devastating consequences and should therefore be avoided as far as possible.

Starting methods according to prior technology are thus very sensitive and require a very precise control of the fuel concentration in the ignition zone of the burner member or members at the moment when the fuel is supplied to said zone and the ignition of the same shall be carried out for generating a burner member flame.

SUMMARY OF THE INVENTION

A purpose with the present invention is to achieve a method by means of which the above mentioned disadvantages of the prior art are avoided. The method should guarantee that no explosive mixture of fuel and air extends through the combustion chamber, the turbine and an exhaust channel of the gas turbine connected to the turbine at the starting moment when ignition of the fuel takes place by activating the ignition member.

This purpose is achieved by means of the initially defined method, which is characterized in that the fuel which is initially supplied to the burner member and which is ignited by means of the ignition member and generates a burner member flame mainly comprises an ignition gas.

Unlike prior technology, the invention thus suggests that an ignition gas, such as for example a liquefied petroleum gas, at the starting moment is conveyed into the ignition zone via the burner member instead of a liquid fuel mixed with air. The ignition gas has the advantage of being very easily ignitable, which results in that it is ignited by the ignition member and generates a burner member flame immediately. The risk is minimal that the ignition of the gas will fail and that the gas will flow all the way to the turbine and to the exhaust channel before the ignition of the gas takes place.

According to a preferred implementation of the method, a liquid fuel is supplied to the burner member after that a burner member flame generated by said ignition gas has been obtained, in order to contribute to the generation of the burner member flame. Since a stable burner member flame already exists when the liquid fuel, preferably an oil or an oil mixture, is conveyed into the flame zone, this liquid fuel will immediately be ignited and contribute to the stability of the already generated burner member flame. The concentration of liquid fuel in the ignition zone or the flame zone is thus not as critical as in the prior technology.

According to a further preferred implementation of the method, the activation of the burner member comprises ignition of a separate ignition flame intended to ignite said ignition gas for generating the burner member flame. Such a separate ignition flame may easily obtain a considerable stability. The stability ensures in its turn a reliable ignition of the ignition gas as soon as it reaches the area in which the ignition flame exists.

According to a further preferred implementation, the burner device comprises a plurality of burner members, each of which is supplied with an ignition gas which is ignited and which generates a burner member flame at least with indirect support of said activation of the ignition member. The indirect support is a consequence of the fact that the activation of the ignition member initiates the ignition of the ignition gas at a first burner member and the generation of a burner member flame. This burner member flame is in its turn stable and strong enough to ignite the gas which is supplied to the ignition zone of a neighboring burner member and to thereby generate a burner member flame at this burner member. In such a manner a successive, almost immediate ignition of a plurality of burner members arranged in parallel and next to each other is obtained.

According to a further implementation, the burner member flame generated by said ignition gas is extinguished at at least one of said plurality of burner members when all burner members have obtained a burner member flame generated by said ignition gas. In a subsequent step, when the other burner members are supplied with a liquid fuel, no liquid fuel is supplied to the burner member or members of which the burner member flame was extinguished during the previous step. A subsequent acceleration of the gas turbine thus takes place while using only some of the burner members of the burner member device, which burner members then have burner member flames which mainly are generated by means of a liquid fuel. This use of only some of the burner members during the initial acceleration phase of the gas turbine is advantageous from the point of view of emissions and results in an improved use of the energy of the fuel which is used.

According to a further preferred implementation, the burner member or members of which the burner member flame was extinguished when all of said plurality of burner members has obtained such burner member flames, are kept extinguished during a subsequent acceleration of the gas turbine and thereafter are supplied with liquid fuel at previously defined operating conditions of the gas turbine. In such a manner the number of active burner members increases as the gas turbine approaches a suitable operational speed. During normal, continuous operation preferably all burner members are active such that they are supplied with the liquid fuel for generating burner member flames. By the step by step increase of the number of active burner members during the acceleration phase optimal combustion condition of the ignited burner members may be achieved at the same time as the amount of emissions, primarily of $NO_x$, is minimised.

According to further preferred implementation, the burner device comprises a plurality of burner members arranged in a ring and directed towards a combustion chamber common for these burner members, wherein at least two ignition members are activated at burner members separated by one or more further burner members. In case contrary to expectation the activation of one ignition member would not result in the ignition of the ignition gas of the closely positioned burner member, the possibility still remains to obtain an ignition of ignition gas by the activation of the other ignition member.

Further features and advantages with the present invention will be clear from the following description and from the remaining dependent claims.

SHORT DESCRIPTION OF THE DRAWINGS

Figure 2:
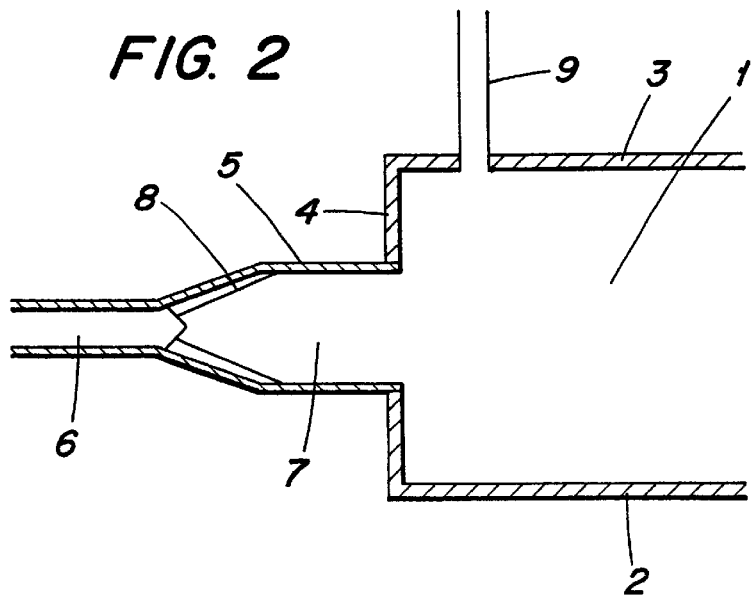

An embodiment of the present invention will now be described more in detail in an exemplifying but not limiting purpose and with reference to the annexed drawings, on which:

FIG. 1 is a cross-sectional view of a burner device according to the invention, at the inlet to a the combustion chamber, and FIG. 2 is a cross-sectional view according to II—II in FIG. 1.

DETAILED DESCRIPTION OF AN IMPLEMENTATION

FIG. 1 is a cross-sectional view which schematically shows the inlet to the combustion chamber 1 as seen from the direction of the combustion chamber 1. The combustion chamber 1 is ring-shaped and is limited by an inner wall 2, an outer wall 3 and a front wall 4. At an outlet end which is not shown the combustion chamber leads to a turbine, arranged to be operated by means of combustion gases from the combustion chamber 1.

A burner device is arranged at the inlet end of the combustion chamber 1. The burner device comprises a plurality of burner members 5, which are arranged in parallel with each other and each of which penetrates the front wall 4. Each burner member 5 comprises a conduit member 6, via which at least a liquid fuel is arranged to be supplied to a zone 7 in which the fuel is mixed with compressor air which via air conducting members 8 is conducted into said zone 7. The air is preferably compressor air delivered from a not shown compressor. The main portion, preferably essentially all air which is supplied to the combustion chamber 1 is conducted into the same via the burner members 5. The conduit member 6 suitably comprises separate channels (not shown) for the supply of gas and liquid fuel, respectively.

The burner device comprises also two ignition members 9, which in this case are arranged essentially diametrically opposite to each other. Each ignition member 9 comprises an ignition burner which projects through a combustion chamber wall, in this case the outer wall 3. The ignition member 9 may be activated by the supply of a fuel, for example liquefied petroleum gas or natural gas, and by ignition of the fuel with the purpose of generating an ignition flame which in this case is directed towards an area in which the front of the flame of a burner member 5 is intended to be positioned. The ignition flame is thereby directed from a lateral position towards an area immediately downstream of an end of the space or the zone 7 in which a fuel, mainly a liquid fuel, is intended to be mixed with air and generate said burner member flame.

During the start of the burner device, an ignition gas or an ignition gas mixture, which for example may comprise liquefied petroleum gas or natural gas, is supplied to the burner member 5 via the conduit member 6. Before the ignition gas reaches into the combustion chamber 1 the ignition members 9 are activated with the purpose of generating ignition flames with extend towards an area immediately downstream of the end space of the mixing zone 7 at the respective burner members 5 at which the two ignition members 9 are arranged.

When the ignition gas reaches said ignition flame, an immediate ignition of the ignition gas takes place, and a burner member flame is generated at the burner members 5 at which the ignition members 9 are arranged. Ignition gas is at the same time supplied to all the other burner members 5. The burner member flames generated at the ignition members 9 are strong enough to ignite the ignition gas which flows out into the combustion chamber 1 via neighboring burner members 5. The burner member flames of these burner members ignite in their turn ignition gas of neighboring burner members 5 and so on until all burner members have a burner member flame. Since the ignition gas preferably is easily ignitable as essentially simultaneous and immediate ignition of all burner members 5 may be achieved in this manner.

When all burner members 5 have burner member flames generated by means of the ignition gas or the ignition gas mixture, the ignition members 9 are deactivated such that, in this case, the two ignition flames are extinguished. Thereafter the supply of ignition gas is stopped to a number of burner members 5 which in a following phase will not be supplied with liquid fuel simultaneously with the other burner members. For example, the supply of ignition gas may be stopped to half of the burner members 5. It is however also possible to stop the supply to more or fewer than half of the burner members 5. If half of the burner members 5 are stopped, then for example each second burner member 5 may be stopped. It has in fact appeared to be an advantage if the number of non-stopped burner members 5 is relatively evenly distributed in the burner device. The purpose with stopping the supply to certain burner members 5 is to optimise the operation condition and to minimise the emissions at the other burner members 5 during a subsequent acceleration of the gas turbine, during which said other burner members 5 are supplied with liquid fuel.

A liquid fuel is thus thereafter supplied to the other burner members 5, i.e. those which have not been stopped, while they still have burner member flames generated by said ignition gas or said ignition gas mixture. The liquid fuel is mixed in the space 7 with air and contributes to the generation of the burner member flames. Since a liquid fuel is supplied only to some of the burner members 5 the amount of liquid fuel which is supplied to each burner member 5 may increase. This results in that the proportion of fuel to air increases. The fuel concentration will thus be higher in the burner members 5 which are supplied with liquid fuel. This results in a high efficiency of the combustion, which in its turn leads to a more reliable ignition of the fuel. Since the liquid fuel is supplied only to some of the burner members 5, the pressure in the conduits in which the fuel is conducted to the burner members 5 increases. The burner members 5 normally comprise nozzles by means of which the liquid fuel is injected into the burner device in such a manner that drops are formed. Since the pressure in the fuel conduit to the burner members 5 increases, also the fall of pressure across the nozzles in the burner members 5 increases. This leads also to an improved drop formation and to a more even drop distribution. Also this drop formation leads to a more reliable ignition of the fuel.

After an initial acceleration of the gas turbine, the supply of ignition gas is shut off. The continued acceleration of the gas turbine takes place while the burner members 5 are supplied only with liquid fuel. As the speed of the gas turbine increases, liquid fuel is supplied to the burner members 5 which previously have been kept shut off. If for example, half of the burner members 5 have been shut off, the other members 5 may be opened simultaneously. This allows for a relatively simple construction where the liquid fuel for example may be supplied to the burner members 5 by two separate supply conduits. One supply conduit may thus be stopped during the initial phase of the supply of liquid fuel, whereafter this supply conduit is opened such that all burner members 5 are supplied with liquid fuel. It is however also possible to control the supply of liquid fuel to the burner members 5 more individually such that successively more and more of the burner members 5 are supplied with the liquid fuel. By the method according to the invention, according to which liquid fuel is only supplied to some of the burner members 5 during an initial phase, optimal combustion conditions are achieved in the respective burner member flames. As time goes on, the number of active burner members 5 is thus increased until all burner members 5 have burner member flames. If specific operational conditions so require, it is of course not necessary to activate all burner members 5. One of some of the burner members 5 may thus be kept shut off also after that all of the other burner members 5 have been activated.

Thanks to the method according to the invention no non-ignited explosive mixture of liquid fuel and air will be able to flow through the combustion chamber, the turbine and all the way to an exhaust channel connected thereto during the initial starting phase. Furthermore, the step by step increase of the number of active burner members during the acceleration phase will result in that optimal combustion conditions are achieved, which also has as a consequence that the amount of unwanted emissions, primarily of $NO_x$, are minimised.

Of course a plurality of variations and modifications of the above described method according to the invention will be realised by a person skilled in the art without any need for this person to thereby leave the scope of the invention, such as this is defined in the annexed patent claims.

What is claimed is:

1. A method for starting a burner device for a gas turbine, wherein the burner device comprises a plurality of burner members (5) arranged to be supplied with a liquid fuel, and at least one ignition member (9), which is activated for igniting a fuel which is supplied to the burner members (5), wherein the fuel which initially during the start of the burner device is supplied to the burner members (5) and which is ignited by means of the ignition member (9) and generates burner member flames mainly comprises and ignition gas, wherein the activation of the ignition member (9) comprises the ignition of a separate ignition flame intended to ignite said ignition gas for generating burner member flames, wherein the ignition member (9) is deactivated by extinguishing the ignition flame when all burner members (5) have a burner member flame generated by said ignition gas, whereafter the burner member flame generated by said ignition gas is extinguished at at least one of said plurality of burner members (5), whereafter a liquid fuel is supplied to the burner members (5) which have not been extinguished, wherein an initial acceleration of the gas turbine takes place, whereafter a shut off of the supply of ignition gas to said burner members (5) is carried out, whereafter liquid fuel is supplied also to the burner members (5) which previously have been kept shut off.

2. A method according to claim 1, wherein the ignition flame is directed from a lateral position towards an area at which the front of the flame of a burner member (5) is intended to be positioned.

3. A method according to claim 1, wherein the ignition flame is directed from a lateral position towards an area directly downstream of an end of a space (7) in which a liquid fuel is intended to be mixed with air and generate said burner member flame.

4. A method according to claim 1, wherein the burner members (5) are arranged in a ring and directed towards a combustion chamber (1) common for these burner members (5), wherein at least two ignition members (9) are activated at burner members (5) separated by one or more further burner members (5).

* * * * *